United States Patent [19]
Stevens

[11] Patent Number: 5,841,650
[45] Date of Patent: Nov. 24, 1998

[54] HIGH FREQUENCY INVERTER

[76] Inventor: Carlile R. Stevens, P.O. Box 8728, Horseshoe Bay, Tex. 78657

[21] Appl. No.: 901,013

[22] Filed: Jul. 28, 1997

Related U.S. Application Data

[60] Provisional application No. 60/023,042 Aug. 2, 1996.
[51] Int. Cl.⁶ .......................... H02M 7/537; H05B 37/02
[52] U.S. Cl. .......................................... 363/131; 315/219
[58] Field of Search .......................... 363/131; 315/219, 315/DIG. 5

[56] References Cited

U.S. PATENT DOCUMENTS

| | | | |
|---|---|---|---|
| 5,210,470 | 5/1993 | Jones | 315/DIG. 5 |
| 5,563,777 | 10/1996 | Miki et al. | 315/46 |
| 5,629,586 | 5/1997 | Yasuda et al. | 315/46 |
| 5,757,140 | 5/1998 | Nilsen | 315/219 |

*Primary Examiner*—Stuart N. Hecker
*Attorney, Agent, or Firm*—Roger A. Marrs

[57] ABSTRACT

The subject invention describes a method of generating high frequency power. Although it can be used for any purpose it is primarily developed for the operation of fluorescent lamps. The inventive device utilizes a circuit that contains only a small percentage of the electronic complements normally associated with electronic fluorescent lighting ballasts. The circuit is such that dimming of the florescent lamp is easily accomplished. Also disclosed is a method of assembly which combined with the very little parts count produces an electronic ballast, which can be price competitive with the conventional magnetic ballast.

2 Claims, 2 Drawing Sheets

HIGH FREQUENCY INVERTER

BACKGROUND OF THE INVENTION

1. Field of the Invention

The present invention relates to a high frequency power supply primarily for gas discharge lamps, particularly fluorescent lights.

2. Description of Prior Art

There are a great many electronic ballast circuits on the market today, with patents almost too numerous to count. Until now it has been a foregone conclusion that an electronic ballast would necessarily cost more than the conventional old style magnetic inductor type ballast. Electronic ballasts fall into two basic categories; resonance and non-resonance inverters with the resonant category broken into two sub-categories, parallel and series resonance. Each of these circuits have different advantages and disadvantages but all require quite a few electronic components, thus it has never been practical for an electronic ballast to be cost effectively sold against a magnetic ballast without having to factor in potential energy savings. With the disclosed device the advantages of the electronic ballasts (less energy consumption, lighter weight, smaller size) can be had without paying the customary substantial premium. The primary distinctions of the present inventive device over the prior art will be discussed more thoroughly below as the description of the inventive device is developed.

SUMMARY OF THE INVENTION

These and other objectives are achieved in accordance with the present invention, by utilizing a small saturating transformer to determine a fixed operating frequency. In addition the transformer is so connected to the two driving transistors such that no additional electronic components are required. As an example, in all other electronic devices of a series resonant drive nature, diodes are placed across the two bridge transistors to allow the circuit to operate into an inductive load. The present invention utilizes the saturated nature of the drive-winding and the base collector diode of the driven transistor to perform this function, thus, no additional parts are needed.

The objectives of the present invention are to provide a high frequency power source for gas discharge lamps wherein the following objects may be accomplished.

a. The lamp is driven such as to maintain a flicker-free output.

b. Lamp heaters are operated at the specified voltage.

c. The unit may be assembled in a minimum of space add a minimum of labor.

d. The output light level may be adjusted over a wide range to the desired lumen level.

e. The final object of the present invention is to accomplish all the objects (a) through (d), above, at a very low cost, allowing the unit to be reasonably competitive with the electromagnetic ballast.

BRIEF DESCRIPTION OF THE DRAWINGS

The features of the present invention which are believed to be novel are set forth with particularity in the appended claims. The present invention both to its organization and method of operation, together with further objects and advantages, thereof, may be best understood by referring to the following description, taken in connection with the accompanying drawings in which:

DESCRIPTION OF THE PREFERRED EMBODIMENT

Figure 1:
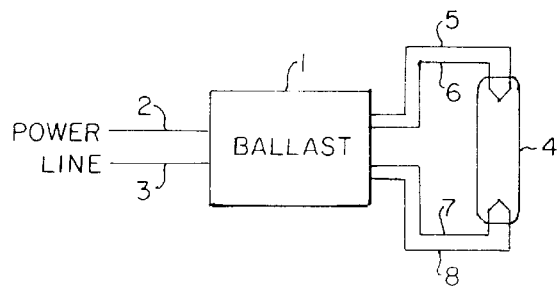
FIG. 1 shows, in block form, a typical installation including the connection to the line power, the ballasting device and the operable fluorescent lamp.
Figure 2:
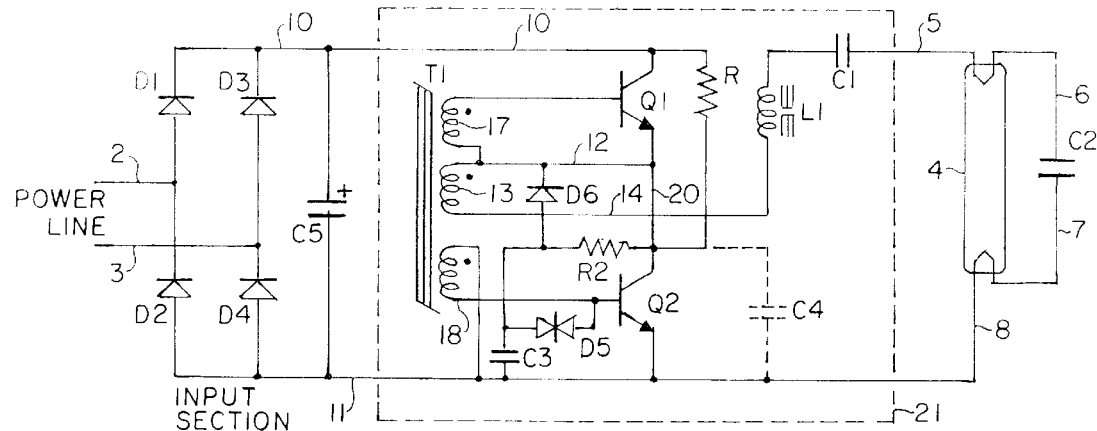
FIG. 2 is the detailed schematic diagram of the preferred embodiment contained within the ballasting device block of FIG. 1.
Figures 6, 7:
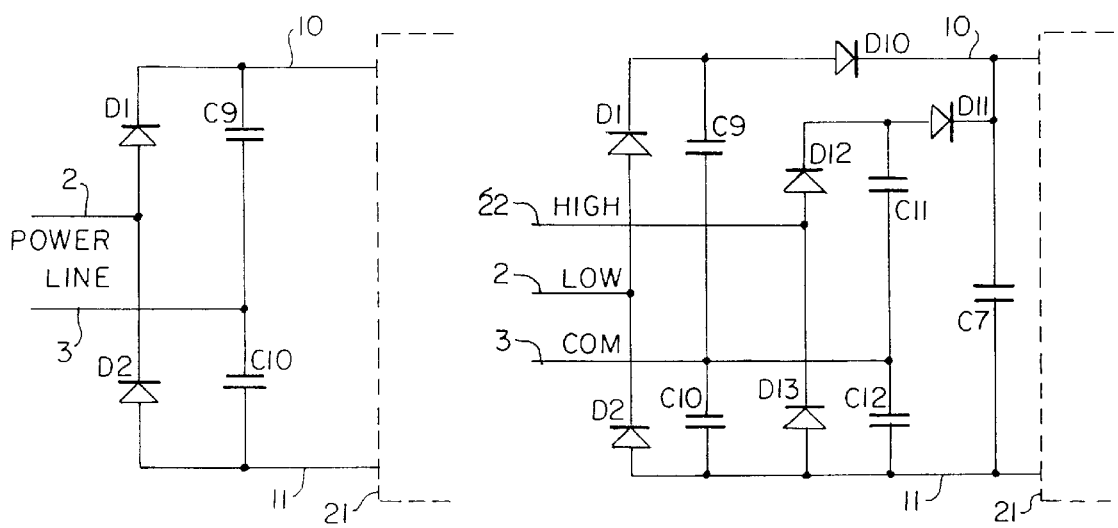
FIG. 6 shows as alternate method of arranging the input section of FIG. 2.
FIG. 7 shows an alternate method of arranging the input of FIG. 3.

Referring to FIG. 1, the inventive device is contained within the ballast 1 which is connected to the power input at lines 2 and 3. The is output connected to fluorescent lamp 4 via the pair of red wires 5 and 6 to one end and by the pair of blue wires 7 and 8 to the other end. Referring now to FIG. 2, which describes the contents of box 1 of FIG. 1. As previously stated, power enters on lines 2 and 3 and is full waved rectified by bridge diodes D1, D2, D3 and D4. Capacitor C5 forms a filter storage device, as in normal input filters of this type, to supply continuous DC to the operational portion of the circuit. The plus voltage/current is supplied on line 10 and the returned on line 11. An alternate input using a doubler method is shown in FIG. 6. Normally, but not necessarily, this circuit would be used for 120V operation.

Only six components T1, Q1 and Q2, L1, C1 and C2 are required for the operation of the circuit, the other five components R1, R2, C3, D5 and D6 are needed only for starting the circuit into operation, once it is running it maintains operation on its own. For the purpose of describing the method of operation we will assume that the circuit is currently in the mode where Q1 is conducting current. Current flows from DC power source 10 through Q1's collector/emitter junction to line 20, through the primary 13 of transformer T1 via line 12 and to inductor L1 via line 14. The current continues to flow from inductor L1 through capacitor Cl, through the red lead 5 which is connected to lead 6 by the heater 15 at one end of the lamp 4, then through capacitor C2, blue lead 7 to the heater 16 at the other end of the lamp and then to lead 8 from the heater to the circuit common 11.

The circuit operates at a frequency above of the resonant frequency of the L1,C1,C2 and load combination such that the combination of L1, C1,C2 and load to have enough impedance to control the proper amount of lamp current for the high voltage applied at line 10. If the circuit were allowed to operate at resonance the impedances of L1, C1 and C2 would cancel out and excessive lamp current would flow as the lamp operational voltage is typically considerably less than the applied voltage from line 10.

Whatever current is flowing through primary 13 must also flow through secondary 17 and through the base emitter junction of Q1 biasing it into the "on" condition, thus the voltage across secondary 17 is clamped at the base emitter voltage of transistor Q1, regardless of the current flowing through secondary 17. This voltage across secondary 17 determines the timed saturation of the core of transformer T1. When T1 saturates there is no longer coupling between primary 13 and secondary 17, and drive is lost for transistor Q1, however due to the storage time of transistor Q1, it will continue to conduct for up to a micro-second or more. Once the stored charge is depleted within the junction of Q1, Q1 will rapidly turn off. L1 and C1 and C2 are so configured that the load will always be inductive, thus current will want to continue to flow in L1 in the same direction it had been flowing via Q1 and the primary of TI. However since Q1 is now off, current will flow through secondary 1 8 of transformer T1, and the base collector junction of transistor Q2 via lines 20 and 12, primary 13, and line 14 to L1. This will cause the voltage to rapidly transition from the voltage of the high rail when Q1 was on to the voltage of the low rail L1 via the condition of the base/collector junction of Q2. In higher power applications, a snubber/capacitor, C3, may be added to slow the transition time and remove some heat from transistors Q1 and Q2. Since the current is flowing in secondary 18 in the same direction as was previously flowing in the primary, the core stays saturated while the inductor draws all the current it needs. Once the inductor has finished drawing current, the current is reverses in the circuit, flowing backwards from the load through line 14, backwards through primary 13, to line 12, 20 and to the collector of Q2, which is in the "on" condition, because its junction still fully charged from the forward conduction of the base collector junction. The current now reverses through the transistor Q2 and flows through the collector/emitter to the common L1.

Since the current has now reversed in transformer T1, it comes out of saturation and commences along the historisis curve to saturation of the opposite direction. This causes appropriate drive polarity on secondary 18 to maintain Q2 in the "on" condition. Once transformer T1 saturates in the opposite direction, drive is removed from Q2, and as before, storage time is waited out, and Q2 turns off, causing the voltage at its collector to transition to the voltage at the high rail 10, via line 12 secondary winding 17 at the base/collector junction of Q1, which clamps the voltage to the plus rail. Again, since the current is still flowing in the same direction, the saturation is maintained until the inductor current goes to zero. At this point, transistor Q1, again turns on, and the process is repeated. This process will repeat indefinitely, with the frequency determined by the forward voltage of transistors Q1 and Q2 and the selection on the core of transformer T1.

Figure 3:
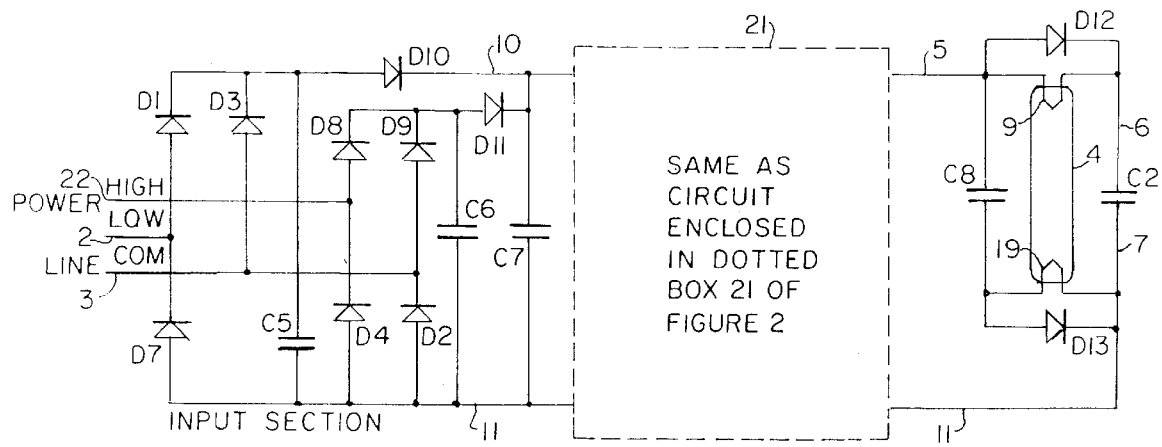
FIG. 3 shows the input circuit of FIG. 2 such that three different light levels may be achieved as with a standard 3 way table lamp. This figure also shows an alternate method of heater connection.

Referring now to FIG. 3. FIG. 3 shows an alternate connection for the input to the adapter, as well as an alternate connection on the output. Discussing the input first it is observed that there are three connections rather than two, this is to allow for three levels of light, the lowest level when line power is connected between inputs 2 and 3, medium level when the line power is connected between 22 and 3, and the highest light output when 22 and 2 are connected together to one side of the line and 3 is connected to the other. When line power is connected only between pins 2 and 3, current flows through diodes D1 to charge capacitor C5 and back through D2 to the common side of the line 3 on the positive half cycle and through diode D3 charging capacitor C5 and return through diode D7 on the negative half cycle of the line power. The voltage stored on capacitor C5 is fed through diode D10 to line 10 of the circuit shown in FIG. 2. Dotted line 21 outlines the parts in FIG. 2 that are the same in FIG. 3. The value of C5 is chosen such that the rail voltage will have fairly low average an average value when considering the 120 ripple and therefore the light output will be at its lowest.

When power is applied on line 22 and line 3 current first flows on the positive half cycle through diode D8 charging C6 and back to common line 3 through D2. On the negative half cycle, current flows through diode D9 charging C6 and back to the high side input 22 through diode D4. The charge accumulating on C6 is fed through diode D11 to line 10 to activate the circuit within the dotted box. The value of C6 is selected such that the average voltage will be higher and the light output will be higher or brighter. When power is applied to both inputs 22 and 2 tied together and common 3, both capacitors C5 and C6 are charged and their combined voltage is fed through diodes D10 and D11 to line 10 and the light reaches its maximum brightness. In this manner three different light output may be obtained with a single ballast/lamp arrangement. Capacitor C7 provides a high frequency bypass for the circuit in box 21 as diodes D10 and D11 prevent capacitor C5 from performing this function as it does in the circuit of FIG. 2.

FIG. 3 also shows an alternate connection for lamp 4 of FIG. 1 and 2. Here an additional capacitor C8 supplies the current through heater 19, while the original capacitor C2 supplies the current through heater 9. Current flows through the lamp via line 5 through heater 9, to heater 19 and returns via line 11. Diodes D12 and D13 are added when necessary to reduce the heater voltage, because in some instances the type of lamp used will require a different voltage than would normally be present if the circuit operated as described.

Figure 4:
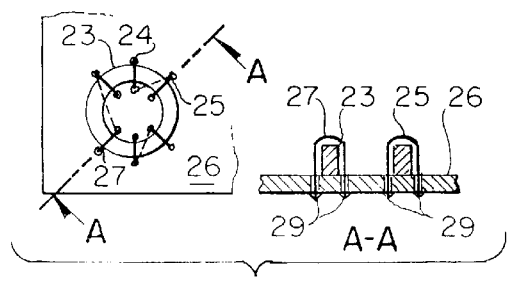
FIG. 4 depicts how the saturating transformer of FIG. 2 is assembled and attached to the printed circuit board.

Referring now to FIG. 4. FIG. 4 shows a unique mounting and assembly method for transformer T1 of FIG. 2. The core of the transformer 23 is literally set onto PC board 26 and stapled down with wire staples as shown by staple 25 and 27. The other of the staples are soldered into the board at points 29 to make connections as the actual turns of the transformer. This eliminates the process of creating a separate already wound transformer to insert into the circuit board and solves any mounting problems at the same time.

Figure 5:
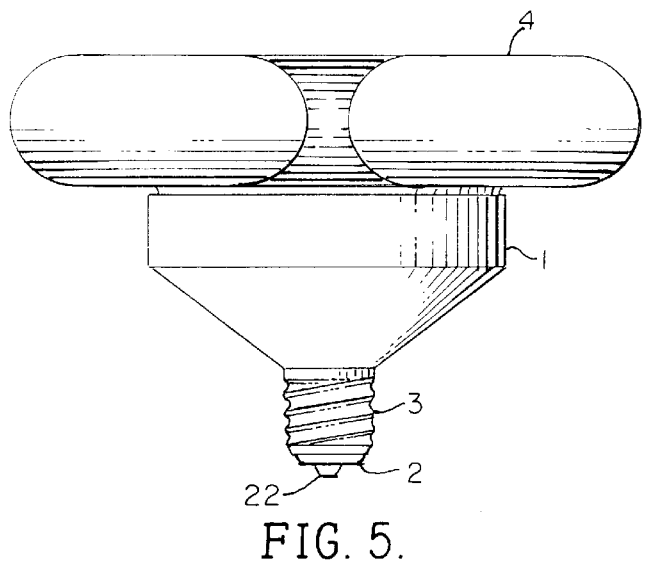
FIG. 5 depicts the inventive device installed as a 3 way adapter in table lamp.

FIG. 5 shows the completed assembly of a typical application of the subject patent. Lamp 4 is a folded florescent tube typically a 2D type lamp but may also be any other type of florescent light including a circdeline lamp. The lamp is plugged into ballast assembly 1 and connection is made to power through the screw terminal common 3 and then the two additional terminals 2 and 22 for the low and high inputs, thus when the unit is installed in a conventional three way incandescent lamp socket it will function exactly in the same manner as a three way incandescent lamp with the attendant power savings of the florescent lamp.

Referring now to FIG. 6. FIG. 6 shows an alternate method of input for FIG. 2, rather than a bridge rectifier as shown in FIG. 2, a doubler is used. This would normally be the case in a 120 volt unit. During the positive half cycle, the positive C9 is charged through D1 to the peak of the positive line. During the negative half cycle of the line voltage input capacitor C10 is charged by diode D2 to the negative peak the line, therefore the DC voltage across the two capacitors can be as high as two times the peak voltage of the line input, hence, the word doubler.

FIG. 7 is alternate construction where the input as shown in FIG. 3 wherein a doubler is utilized as in FIG. 6, instead of the bridge configuration shown in FIG. 3. The same circuit as shown in FIG. 6, using diodes D1, D2, C9 and C10 is employed, and diodes D10 and D11 direct the output of each of the doubler circuits to input 10 of the dotted box 21.

Capacitor C7 serves as a small filter for the high frequency that is drawn by the operation movement within box 21.

Intending to claim all the novel features shown and described, the inventor claims as follows:

I claim:

1. A high frequency inverter comprising:

a source of direct current power;

a pair of switching transistors connected in series across said source of DC power with the collector of the first transistor connected to the positive source of said DC power the emitter of said first transistor connected to the collector of the second transistor, the emitter of said second transistor connected to the negative polarity of said source of DC power;

a resonant network and load comprised of an inductor and capacitor connected in series with the load connected across or in parallel with said capacitor, the combination of said load and said capacitor connected at one end of their parallel connection to the negative polarity of said source of DC power, the opposite end of said capacitor and load combination connected to said inductor;

a drive transformer comprising one primary and two secondary windings the first secondary winding connected between the base and emitter of said first transistor the second secondary winding connected between the base and emitter of said second transistor said first and second secondary windings connected in opposite polarity to each other;

the primary of said drive transformer connected such that the polarity of the primary is the same as the secondary winding driving said first transistor and opposite to the polarity of the secondary winding driving said second transistor;

said primary connected to the junction of said first and second transistors, collector and emitter in such a manner that when current flows into said primary from said junction said first transistor will be turned on by current flowing from said first secondary;

a DC blocking capacitor connected in series with said primary of said drive transformer and said resonate network inductor;

the core of said drive transformer to be selected as the saturating type and calculated to saturate in both the positive and negative direction during operation of the described circuit with a time fast enough to operate said switching transistors at a frequency higher than the natural resonant frequency of the inductor, capacitor and load combination.

2. A high frequency inverter as described in claim 1, wherein:

the base collector diode of each transistor and the corresponding secondary of the drive transformer are used as the clamping diodes such that lagging inductive load currents are safely transferred to and from said source of direct current power.

* * * * *